Figure 1:
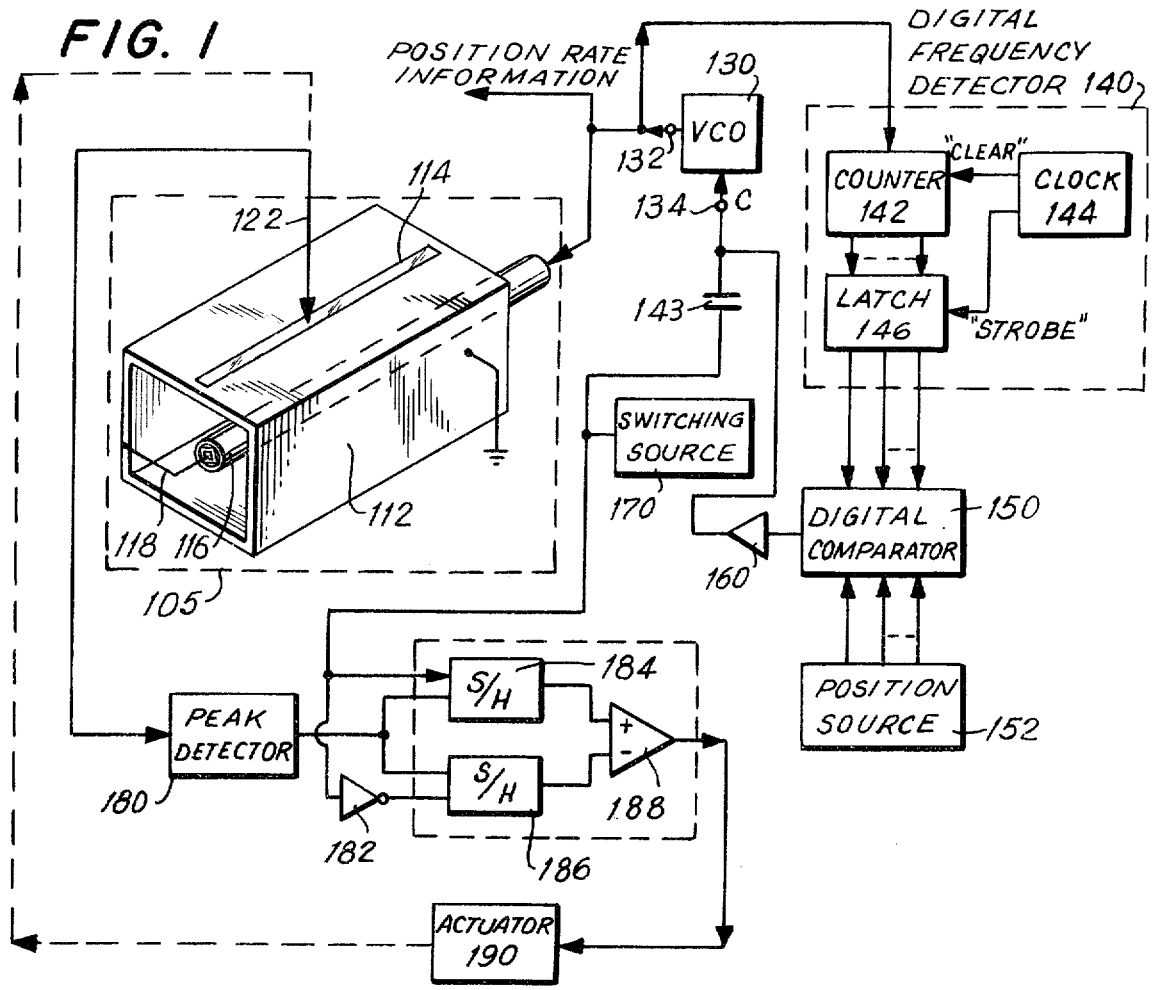

United States Patent [19]
Kliphuis

[11] 3,932,795
[45] Jan. 13, 1976

[54] SERVO CONTROL POSITIONING APPARATUS INCLUDING A STANDING WAVE DETECTOR

[76] Inventor: Jans Kliphuis, 124 Southdown Road, Huntington, N.Y. 11743

[22] Filed: Nov. 19, 1973

[21] Appl. No.: 417,143

[52] U.S. Cl. .................. 318/669; 333/17; 324/95; 250/250
[51] Int. Cl.² .................................. G05B 1/06
[58] Field of Search ........ 318/669; 333/17; 324/95; 250/250

[56] References Cited
UNITED STATES PATENTS

| | | | |
|---|---|---|---|
| 3,122,665 | 2/1964 | Bailey | 318/669 X |
| 3,209,220 | 9/1965 | Joy | 318/669 |
| 3,448,358 | 6/1969 | Grudin et al. | 318/669 X |
| 3,749,999 | 7/1973 | Kliphuis | 318/669 |

*Primary Examiner* — T. E. Lynch
*Attorney, Agent, or Firm* — Donald P. Gillette, Esq.

[57] ABSTRACT

Apparatus for effecting relative positioning between two mechanical members in accordance with digital (or analog) commands includes a standing wave supporting, electrical wave propagating structure terminated other than by its iterative impedance. The wave structure is mechanically fixed to one mechanical member, and a probe is coupled to the wave structure and fixed for translation with the other mechanical member.

A voltage controlled oscillator excites the wave structure developing a standing electrical wave therein — the wave pattern node positioning being determined by the input digital command. Feedback servomechanism apparatus then responds to the potential induced in the probe (or, by superposition, that on the wave structure) for positioning the probe at the requisite standing wave null point.

In accordance with one aspect of the present invention, the wave propagating structure is sealed, and the probe disposed external thereto, to preserve measuring accuracy.

8 Claims, 3 Drawing Figures

3,932,795

SERVO CONTROL POSITIONING APPARATUS INCLUDING A STANDING WAVE DETECTOR

DISCLOSURE OF THE INVENTION

This invention relates to electronic instrumentation and control apparatus and, more specifically, to an improved position transducer - transducer controlled position implementing servomechanism organization.

In many applications of present day interest, it is necessary to determine the relative position of two mechanical members along one or more axes of a coordinate axis system. Thus, for example, it is important to accurately determine the relative positioning between a work piece and certain tool assemblies. Such tools may comprise a drilling, cutting, milling or other mechanical process element; an electrical printed circuit board component assembler or back plane wiring head; an integrated circuit wafer testing probe assembly; an X-Y plotter; or the like.

As below discussed, existing position reporting transducers are not entirely satisfactory. For example, for the machine tool context; relative positioning between a work supporting table and the tool is effected via a lead screw and follower nut, or equivalent mechanical apparatus, also having a position reporting scale mechanically coupled thereto. However, the lead screw or other actuator exhibits lost mechanical motion or backlash, i.e., a "dead zone" or lag between the inception of actuation (with a concomitant change in output position reading), and actual movement of the controlled member. This hysteresis limits the accuracy of the output position display, and comprises a major source of positional error and uncertainty.

My U.S. Pat. No. 3,749,999 issued July 31, 1973 for "Position Sensing Transducer Including An Electrical Wave Propagating Structure of Varying Electrical Length" discloses a certain wave propagating apparatus which effects position sensing and implementation. The disclosure of said patent is included herein by reference. The instant case is directed to certain improvements and alternative physical realizations with respect to the general transducing principles set forth in said patent.

It is thus an object of the present invention to provide improved position implementing apparatus.

More particularly, an object of the present invention is the provision of automated/manual position effecting apparatus which obviates mechanical hysteresis and other errors; and which may be reliably employed to position two mechanical members with a high degree of accuracy.

The above and other objects of the present invention are realized in a specific illustrative position implementing apparatus for controlling the relative displacement of two mechanical members in accordance with an input command.

The input command (e.g., a parallel digital word from a machine controlling central processor) acts through feedback apparatus to control the output of a voltage controlled oscillator which excites a mismatched electrical wave propagating structure, developing standing waves thereon. The particular standing wave node positioning is, of course, dependent upon the voltage controlled oscillator output frequency, and thus proximately upon the input command.

A probe is coupled to the wave propagating structure, the structure and the probe being mechanically fixed for translation with a different one of two subject mechanical members. A feedback - servomechanism loop responds to the voltage developed in the probe (or, in an alternative embodiment, on the wave structure) by automatically positioning the probe at the standing wave node thus controlling the displacement of the mechanical members.

In accordance with one aspect of the present invention, the wave supporting structure - e.g., slab or strip line, slotted waveguide or coaxial cable, or the like, is fully sealed and enclosed, and the probe mounted to translate external thereto, to preserve accuracy under changing, and sometimes debilitating ambient conditions.

Figure 2:
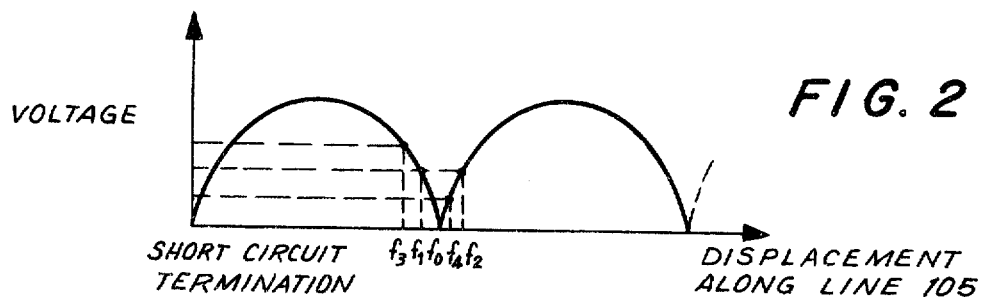
Figure 3:
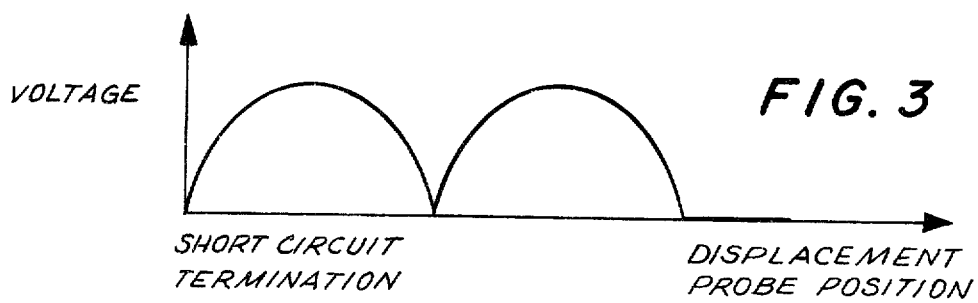

The above and other features of the present invention will become more clear from a detailed description of specific, illustrative embodiments thereof, described below in conjunction with the accompanying drawings, in which:

FIG. 1 schematically depicts position transducing - implementing apparatus embodying the principles of the present invention;

FIG. 2 illustrates a standing wave pattern characterizing a wave propagating structure 110 in the FIG. 1 embodiment; and FIG. 3 depicts a standing wave pattern for an alternative excitation arrangement.

Referring now to FIG. 1, there is illustrated automated positioning apparatus comprising a wave propagating structure 105 terminated with other than its characteristic impedance — e.g., a short circuit 118. The structure 105 is showed as comprising a wave guide-like conducting outer surface 112, and a mechanically compound (for rigidity) center conductor 116. Other wave supporting structures such as slab or strip line, coaxial cable or the like may be employed as well. The structure 105 is preferably sealed to isolate the interior thereof from the surrounding environment which may often be quite uncontrolled (as in a machine tool application), and which may disturb the standing wave pattern in the line, causing inaccuracies. For purposes discussed below, the circumferential outer surface 112 of the composite line 105 includes an axial slot 114 which may be sealed by a suitable nonconductive sheet, such as quartz. Further, and preferably, end plates may completely seal the structure 105 and also provide support for the center conductor 116, one of said end plates being conductive (to form termination 118) and one being nonconductive.

An electrical probe 122 is disposed to translate along the axial slot 114 of the slab line 105 while being electrically coupled to the lining, the end of the probe moving just above the quartz sheet 114.

The probe 122 and the wave supporting structure 105 are fixed for relative translation with differing ones of two mechanical members to be controlled - e.g., a machine tool active element (e.g., a drill bit) and a workpiece supporting and conveying table. Thus, at any time, the position of the probe 122 vis-a-via the axis of the line 105 reflects tool (e.g., drill) positioning vis-a-via the workpiece. Further, the workpiece positioning apparatus shown in the drawing includes a servomechanism actuator 190 for selectively moving the tool (and probe 122) relative to the workpiece (and slab line 105).

A voltage controlled oscillator (VCO) 130 energizes the line 105 via an output port 132 with a particular frequency which, for reasons set forth below, corresponds to a desired and specific position for the probe 122 along the line 105. The VCO output frequency is established by an input digital command word in a position source register 152. The register 152 may comprise for example, an output register of a machine tool controlling computer central processor. Of course, the register 152 may be manually loaded as well.

The VCO frequency is controlled by the contents of register 152 by straightforward feedback principles well known to those skilled in the art, and depicted in detail in the drawing. In brief, a counter 142 counts the number of VCO output pulses over a timed interval (under control of a clock source 144), and the maximum count (just before counter clearing) is strobed (for preservation) into the latch 146. A digital comparator 150 and following amplifier 160 compare the contents of the registers 146 and 152, and automatically supply the requisite steady state control signal to VDO control port 132 to slave the VDO 130 output frequency to the command word contents of the register 152.

The output of the voltage controlled oscillator 130 drives the short circuit terminated line 105 and, by reason of the non-iterative impedance termination, induces a standing wave distribution pattern thereon. The particular standing wave pattern is shown in FIG. 2. (As discussed below, the line 105 may be driven as well via the probe 122, developing the standing wave line distribution of FIG. 3.). The particular location of the zero voltage node(s) depends on VCO output frequency, that shown in the drawing resulting from a line energization of frequency $f_o$.

In accordance with the underlying principles of the present invention, a second feedback loop (i.e., one distinct from the VCO frequency controlling loop) operates to position and maintain the probe 122 at the node point. To this end, the VCO output frequency is deviated in equal amounts about the center frequency $f_o$ by a switching source 170 (e.g., any relaxation oscillator). A capacitor 172 superimposes the A.C. voltage perturbation developed by source 170 on the essentially D.C. control signal supplied by the amplifier 160. It is observed at this point that the VCO controlling feedback loop is too slow to respond to the varying VCO - averaging its frequency to the value $f_o$. This may be effected by simply providing a counting period for counter 142 which is long compared to the period of the switching signal provided by source 170.

The voltage induced in the probe 122 is peak detected (at element 180) to obtain a measure of the standing wave (i.e., the envelope curve of FIG. 2). This peak voltage - an analog level which may vary between two values as the VCO alternates between its two frequencies, is gated into and preserved by two sample and hold circuits 184 and 186. Due to an inverter 182 between the source 170 and the sample-and-hold circuit 186, the circuits 184 and 186 are alternately gated into their sampling mode by the same switching source 170 which deviates VCO frequency so that the circuits 184 and 186 store the standing wave amplitude at the two differing frequencies. The outputs of circuits 184 and 186 are then compared by a difference amplifier 188. The output of the difference amplifier is of a polarity to energize the servomechanism 190 to mechanically move the probe 122 (and thereby also the connected machine tool component) in a direction to obviate any difference between the outputs of circuits 184 and 186. The elements 184, 186 and 188 comprise a synchronous detector, many embodiments of which are well known to those skilled in the art.

The feedback loop just described serves to automatically position the probe and connected mechanical member to the desired position (i.e., the node point in FIG. 2). To illustrate, assume first that the probe is properly located at the node location. The VCO 130 will supply frequencies $f_1$ and $f_2$ equally spaced from $f_o$. Since the standing wave curve is symmetrical about $f_o$, equal voltages vo will be detected by the probe 122 at $f_1$ and $f_2$, such that the outputs of storage circuits 184 and 186 will be equal. Accordingly, there is a zero output from difference amplifier 188 and the servo driver 190 is not activated.

Assume now that the probe 122 is positioned too far to the left — either because a new location (to the right) has been commanded or because the workpiece or machine tool head has shifted. The resulting effective VCO deviated frequencies $f_3$ and $f_4$ (FIG. 4) are skewed to the left, and produce unequal outputs $V_1$ and $V_3$. This results in unequal inputs to the amplifier 188 which produces an output potential of a polarity which drives the probe to the right. Similar action occurs to correct or institute a left shift of the probe 122 relative to the slab line 105 when required.

It will be understood in the above discussion, of course, that the standing wave pattern shifts with frequency, and that the frequencies $f_o$-$f_3$ and the corresponding voltages $V_0$-$V_3$ represent the probe position vis-a-vis the then effective standing wave pattern.

The arrangement of FIG. 1 has thus been shown by the above to comprise an improved automated positioning arrangement, i.e., to respond to input commands by both effecting and maintaining a prescribed relative displacement between two mechanical members (and of the probe axially 122 along the slab line 105).

Several observations are made at this point. First, analog positional commands may be employed in place of the digital input word, as from a potentiometer. For such case, an analog-to-digital converter may be used to load register 152; or elements 150 and 152 may become analog versions thereof (e.g., a sample/hold circuit and an analog comparator-difference amplifier) and circuitry 140 either replaced by a low pass filter or followed by a digital-to-analog converter.

Then also, it is observed that the slab line 105 was excited at one end, and the signal output taken at the probe 122. By superposition, these may be reversed - i.e., the line excited by connecting the output of VCO 130 to probe 122, and connecting the input detector 180 to the line 105. When excited by the probe 122, the standing wave pattern on the line 105 is depicted in FIG. 3. At steady state the standing waves are developed essentially only between the probe 122 and the short circuit termination. As the switching source 120 deviates VCO frequency, the probe 122 no longer resides at a node. Accordingly, the waves traveling to the right along the line do not effectively cancel - and an output is produced and supplied to the peak  tector 180. As before, if the probe is properly positioned, the two line excitation frequencies produce equal outputs at the sample/hold circuits 184 and 186. If the probe is not where commanded, the inputs to the difference amplifier 188 become imbalanced in a polarity causing the servo 190 to institute the requisite repositioning action.

The above-described arrangements are merely illustrative of the principles of the present invention. Numerous modifications and adaptations thereof will be readily apparent to those skilled in the art without departing from the spirit and scope of the present invention.

What is claimed is:

1. In combination in automated positioning apparatus, an electrical wave propagating structure having a characteristic impedance, means terminating said wave propagating structure in other than its characteristic impedance, probe means coupled to said electric wave propagating structure and adapted for relative movement with respect thereto, a voltage controlled oscillator for supplying an electrical wave to said wave propagating structure, said voltage controlled oscillator thereby impressing a standing wave on said wave propagating structure, first feedback means, including input command means, for controlling the output frequency of said voltage controlled oscillator, thereby also determining node positioning for said standing wave pattern, and second feedback loop means for positioning and maintaining said probe means at a standing wave pattern node, said second feedback means including means for detecting the position of said probe relative to a node of said standing wave pattern, and actuator means responsive to the output of said detecting means for selectively moving said probe means relative to said electric wave propagating structure.

2. A combination as in claim 1 wherein said electrical wave propagating structure is completely enclosed, and wherein said probe means translates external thereto.

3. A combination as in claim 1 wherein said relative position detecting means comprises means for deviating the output frequency of said voltage controlled oscillator between plural states, and synchronous detector means responsive to said deviating means.

4. A combination as in claim 3 wherein said synchronous detector means comprises plural gated storage circuits, and difference amplifier means connected to said storage circuits.

5. A combination as in claim 1 wherein said voltage controlled oscillator is connected to said probe, and said relative position detecting means is connected to said wave propagating structure at a point distinct from said noncharacteristic impedance termination.

6. A combination as in claim 1 wherein said voltage controlled oscillator is connected to said wave propagating structure, and said relative position detecting means is connected to said probe means.

7. A combination as in claim 1 further comprising first and second mechanical means respectively fixed for translation with said probe means and with said wave propagating structure.

8. A combination as in claim 1 wherein said electrical wave propagating structure is completely enclosed and said probe means translates external thereto, said relative position detecting means comprises means for deviating the output frequency of said voltage controlled oscillator between plural states, and synchronous detector means responsive to said deviating means, said synchronous detector means comprises plural gated storage circuits, and difference amplifier means connected to said storage circuits, and further comprising first and second mechanical means respectively fixed for translation with said probe means and with said wave propagating structure.

* * * * *